(12) United States Patent
Davis et al.

(10) Patent No.: US 7,996,618 B2
(45) Date of Patent: Aug. 9, 2011

(54) APPARATUS AND METHOD FOR USING BRANCH PREDICTION HEURISTICS FOR DETERMINATION OF TRACE FORMATION READINESS

(75) Inventors: Gordon T. Davis, Chapel Hill, NC (US); Richard W. Doing, Raleigh, NC (US); John D. Jabusch, Cary, NC (US); M V V Anil Krishna, Cary, NC (US); Brett Olsson, Cary, NC (US); Eric F Robinson, Raleigh, NC (US); Sumedh W Sathaye, Cary, NC (US); Jeffrey R Summers, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/016,144

(22) Filed: Jan. 28, 2011

(65) Prior Publication Data

US 2011/0131394 A1 Jun. 2, 2011

Related U.S. Application Data

(63) Continuation of application No. 11/538,831, filed on Oct. 5, 2006, now Pat. No. 7,934,081, and a continuation of application No. 12/116,696, filed on May 7, 2008.

(51) Int. Cl.
*G06F 9/40* (2006.01)
*G06F 12/08* (2006.01)

(52) U.S. Cl. ........................................ 711/125; 712/239

(58) Field of Classification Search .................. 711/125; 712/239
See application file for complete search history.

(56) References Cited

U.S. PATENT DOCUMENTS

| | | | |
|---|---|---|---|
| 5,920,890 A * | 7/1999 | Moyer et al. .................. 711/144 |
| 6,014,742 A | 1/2000 | Krick | |
| 6,018,786 A | 1/2000 | Krick | |
| 6,073,213 A | 6/2000 | Peled | |
| 6,076,144 A | 6/2000 | Peled | |
| 6,105,032 A | 8/2000 | Bunda | |
| 6,145,123 A | 11/2000 | Torrey | |
| 6,167,536 A | 12/2000 | Mann | |
| 6,170,038 B1 | 1/2001 | Krick | |
| 6,185,675 B1 | 2/2001 | Kranich | |
| 6,185,732 B1 | 2/2001 | Mann | |
| 6,223,228 B1 | 4/2001 | Ryan | |
| 6,223,338 B1 | 4/2001 | Smolders | |
| 6,223,339 B1 | 4/2001 | Shah | |
| 6,256,727 B1 | 7/2001 | McDonald | |
| 6,327,699 B1 | 12/2001 | Larus | |

(Continued)

OTHER PUBLICATIONS

U.S. Appl. No. 11/538,831, filed Oct. 5, 2006, entitled,"Apparatus and Method for Using Branch Prediction Heuristics for Determination of Trace Formation Readiness,".

*Primary Examiner* — William M Treat
(74) *Attorney, Agent, or Firm* — Joseph P. Abate; Daniel E. McConnell

(57) ABSTRACT

A single unified level one instruction(s) cache in which some lines may contain traces and other lines in the same congruence class may contain blocks of instruction(s) consistent with conventional cache lines. Formation of trace lines in the cache is delayed on initial operation of the system to assure quality of the trace lines stored.

12 Claims, 4 Drawing Sheets

U.S. PATENT DOCUMENTS

| | | |
|---|---|---|
| 6,332,189 B1 | 12/2001 | Baweja |
| 6,339,822 B1 | 1/2002 | Miller |
| 6,418,530 B2 | 7/2002 | Hsu |
| 6,442,674 B1 | 8/2002 | Lee |
| 6,449,714 B1 | 9/2002 | Sinharoy |
| 6,453,411 B1 | 9/2002 | Hsu |
| 6,457,119 B1 | 9/2002 | Boggs |
| 6,549,987 B1 | 4/2003 | Rappoport |
| 6,578,138 B1 | 6/2003 | Kyker |
| 6,598,122 B2 | 7/2003 | Mukherjee |
| 6,631,445 B2 | 10/2003 | Rappoport |
| 6,647,491 B2 | 11/2003 | Hsu |
| 6,792,525 B2 | 9/2004 | Mukherjee |
| 6,807,522 B1 | 10/2004 | Orfali |
| 6,823,473 B2 | 11/2004 | Mukherjee |
| 6,854,051 B2 | 2/2005 | Mukherjee |
| 6,854,075 B2 | 2/2005 | Mukherjee |
| 6,877,089 B2 | 4/2005 | Sinharoy |
| 6,950,903 B2 | 9/2005 | Solomon |
| 6,950,924 B2 | 9/2005 | Miller |
| 6,964,043 B2 | 11/2005 | Wu |
| 7,434,073 B2 | 10/2008 | Magklis et al. |
| 7,644,233 B2 * | 1/2010 | Davis et al. ............ 711/118 |
| 7,698,662 B1 | 4/2010 | Wu et al. |
| 2005/0193175 A1 | 9/2005 | Morrow |
| 2008/0086597 A1 * | 4/2008 | Davis et al. ............ 712/239 |

* cited by examiner

APPARATUS AND METHOD FOR USING BRANCH PREDICTION HEURISTICS FOR DETERMINATION OF TRACE FORMATION READINESS

RELATED APPLICATION

This application is a continuing application taking priority from application Ser. Nos. 11/538,831 filed Oct. 5, 2006 now U.S. Pat. No. 7,934,081 and 12/116,696 file May 7, 2008, both owned in common with this application.

FIELD AND BACKGROUND OF INVENTION

This invention relates to the utilization of caches in computer systems.

Traditional processor designs make use of various cache structures to store local copies of instruction(s) and data in order to avoid the lengthy access times of typical DRAM memory. In a typical cache hierarchy, caches closer to the processor (level one or L1) tend to be smaller and very fast, while caches closer to the DRAM (level two or L2; level three or L3) tend to be significantly larger but also slower (longer access time). The larger caches tend to handle both instruction (s) and data, while quite often a processor system will include separate data cache and instruction(s) cache at the L1 level (i.e. closest to the processor core).

All of these caches typically have similar organization, with the main difference being in specific dimensions (e.g. cache line size, number of ways per congruence class, number of congruence classes). In the case of an L1 Instruction(s) cache, the cache is accessed either when code execution reaches the end of the previously fetched cache line or when a taken (or at least predicted taken) branch is encountered within the previously fetched cache line. In either case, a next instruction(s) address is presented to the cache. In typical operation, a congruence class is selected via an abbreviated address (ignoring high-order bits), and a specific way within the congruence class is selected by matching the address to the contents of an address field within the tag of each way within the congruence class. Addresses used for indexing and for matching tags can use either effective or real addresses depending on system issues beyond the scope of this discussion. Typically, low order address bits (e.g. selecting specific byte or word within a cache line) are ignored for both indexing into the tag array and for comparing tag contents. This is because for conventional caches, all such bytes/words will be stored in the same cache line.

Recently, Instruction(s) Caches that store traces of instruction(s) execution have been used, most notably with the Intel Pentium 4. These "Trace Caches" typically combine blocks of instruction(s) from different address regions (i.e. that would have required multiple conventional cache lines). The objective of a trace cache is to handle branching more efficiently, at least when the branching is well predicted. The instruction(s) at a taken branch target address is simply the next instruction(s) in the trace line, allowing the processor to execute code with high branch density just as efficiently as it executes long blocks of code without branches. This type of trace cache works very well as long as branches within each trace execute as predicted. At the start of operation, however, there is no branch history from which to make predictions.

Even after a large number of cycles some branches may not have executed enough times to allow a reliable prediction, leading to formation of trace lines that frequently mispredict program execution. To avoid polluting the cache with such poorly predicted trace lines, the cache can begin execution forming conventional cache lines. Once significant branch history has been accumulated, trace lines can be formed and allowed to replace the conventional lines in the cache. While the conventional cache line mode can be run for a pre-chosen number of cycles, this may cause some well-predicted trace lines to be thrown away during those cycles, and some poorly-predicted trace lines to be used in the time after those cycles. What is needed is an effective mechanism to determine when enough branch history has been accumulated to switch to trace formation mode and achieve better performance than with conventional cache lines.

One limitation of trace caches is that branch prediction must be reasonably accurate before constructing traces to be stored in a trace cache. Switching to trace cache mode before such time will lead to frequent branch mispredicts. This can result in repeated early exits from a trace line when, for example a branch positioned early in a trace was predicted not taken when the trace was constructed, but is now consistently taken. Any instruction(s) beyond this branch are never executed, essentially becoming unused overhead that reduces the effective utilization of the cache. Since the branch causing the early exit is unanticipated, significant latency is encountered (branch misprediction penalty) to fetch instruction(s) at the branch target.

SUMMARY OF THE INVENTION

One intention of this invention is to avoid the inefficiencies described above by defining an effective means to determine when branch prediction is consistent enough to warrant the switch to trace cache mode. This disclosure sets out three main methods for making this determination:

Wait a set number of cycles or instruction(s) to switch to trace formation mode;

Wait until the stored branch history reaches some threshold of predictability; or Wait until the window of previously executed branches reaches some threshold of correct predictions.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

Figure 1:
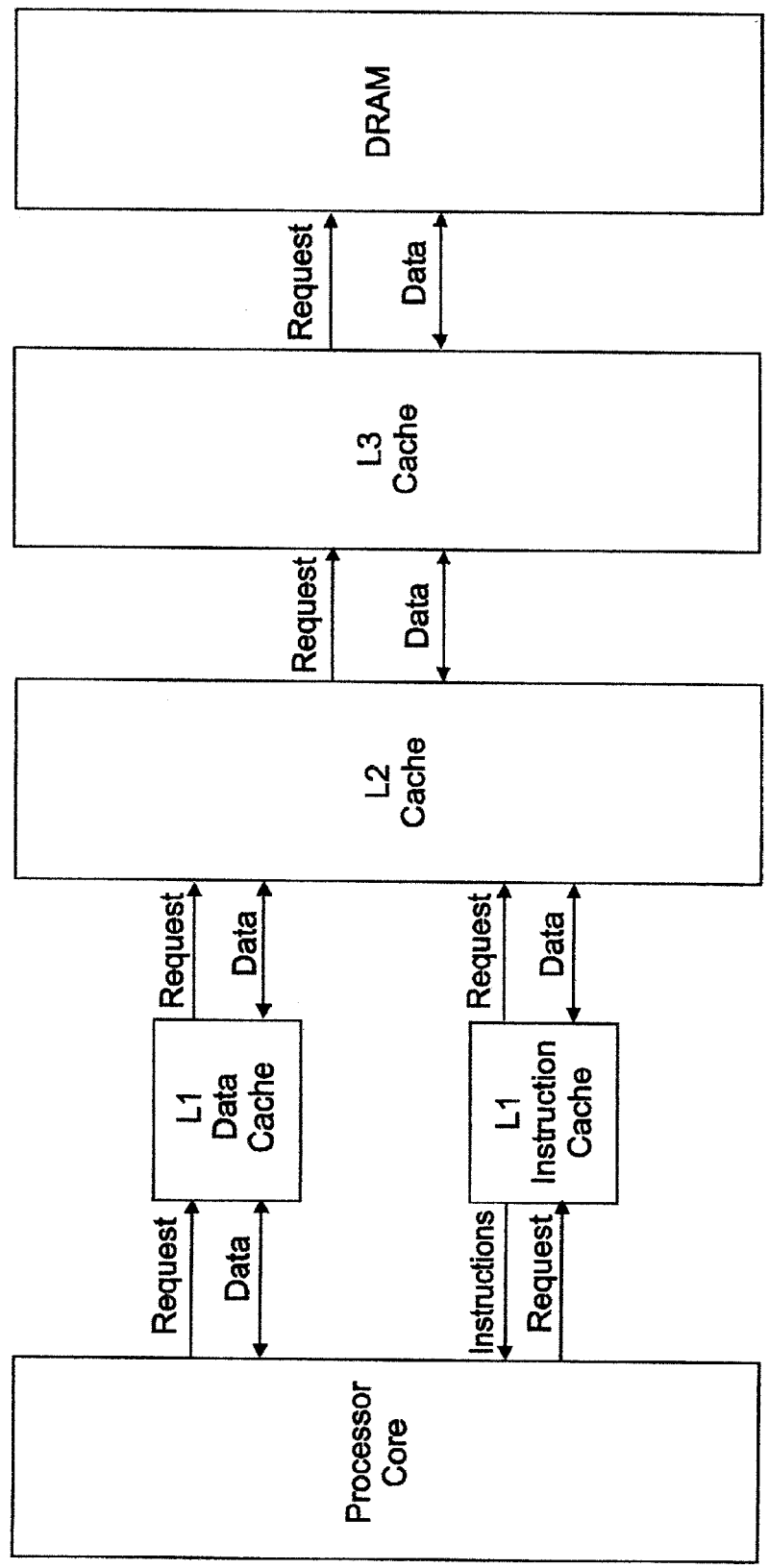
FIG. 1 is a schematic representation of the operative coupling of a computer system central processor and layered memory which has level 1, level 2 and level 3 caches and DRAM.

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Discussion now turns to the three general approaches to the determination of trace formation readiness mentioned above. They are listed above in increasing order of complexity, with each step giving a more granular approach to the determination of trace formation readiness. While this granularity does not guarantee better trace cache performance, in most cases it should give a more accurate view of the current branch predictability for the code in execution. While only the second and third mentioned approaches require any knowledge of branch execution, actual trace formation requires that same knowledge Concerning the use of a set number of cycles/instruction(s), this approach keeps a simple counter that increments with each cycle or instruction(s) executed. When the counter reaches a preset threshold trace formation begins. While this is a simple method, it provides no means of adjusting the start of trace formation based on the code in execution.

Concerning the use of a branch history table (BHT), most BHT implementations keep not only a prediction of taken or fall-through for executed branches, but also a strength of that prediction. This method would use some metric of the strength of each prediction in the BHT to determine trace formation readiness. An example would be a threshold for the number of BHT entries that are at or above a certain strength of prediction. The complexity of the threshold being checked is dependent on the granularity of the prediction strength in the BHT, with more granularity in the stored prediction strength allowing for a more accurate view of the current branch predictability.

Concerning previous prediction accuracy, this approach tracks the accuracy of branch predictions as those branches execute, and uses that information to determine trace formation readiness. An example of this method would use a counter that incremented with execution of each correctly predicted branch, and would begin trace formation when that counter reached a preset value. However, even code with poorly predicted branches would eventually meet that threshold. A better method would be an up-down counter, which increments with execution of each correctly predicted branch but decrements with execution of each incorrectly predicted branch. Again, trace formation would begin once a preset value was met.

The term "programmed method", as used herein, is defined to mean one or more process steps that are presently performed; or, alternatively, one or more process steps that are enabled to be performed at a future point in time. The term programmed method contemplates three alternative forms. First, a programmed method comprises presently performed process steps. Second, a programmed method comprises a computer-readable medium embodying computer instruction(s) which, when executed by a computer system, perform one or more process steps. Third, a programmed method comprises a computer system that has been programmed by software, hardware, firmware, or any combination thereof to perform one or more process steps. It is to be understood that the term programmed method is not to be construed as simultaneously having more than one alternative form, but rather is to be construed in the truest sense of an alternative form wherein, at any given point in time, only one of the plurality of alternative forms is present.

Figure 2:
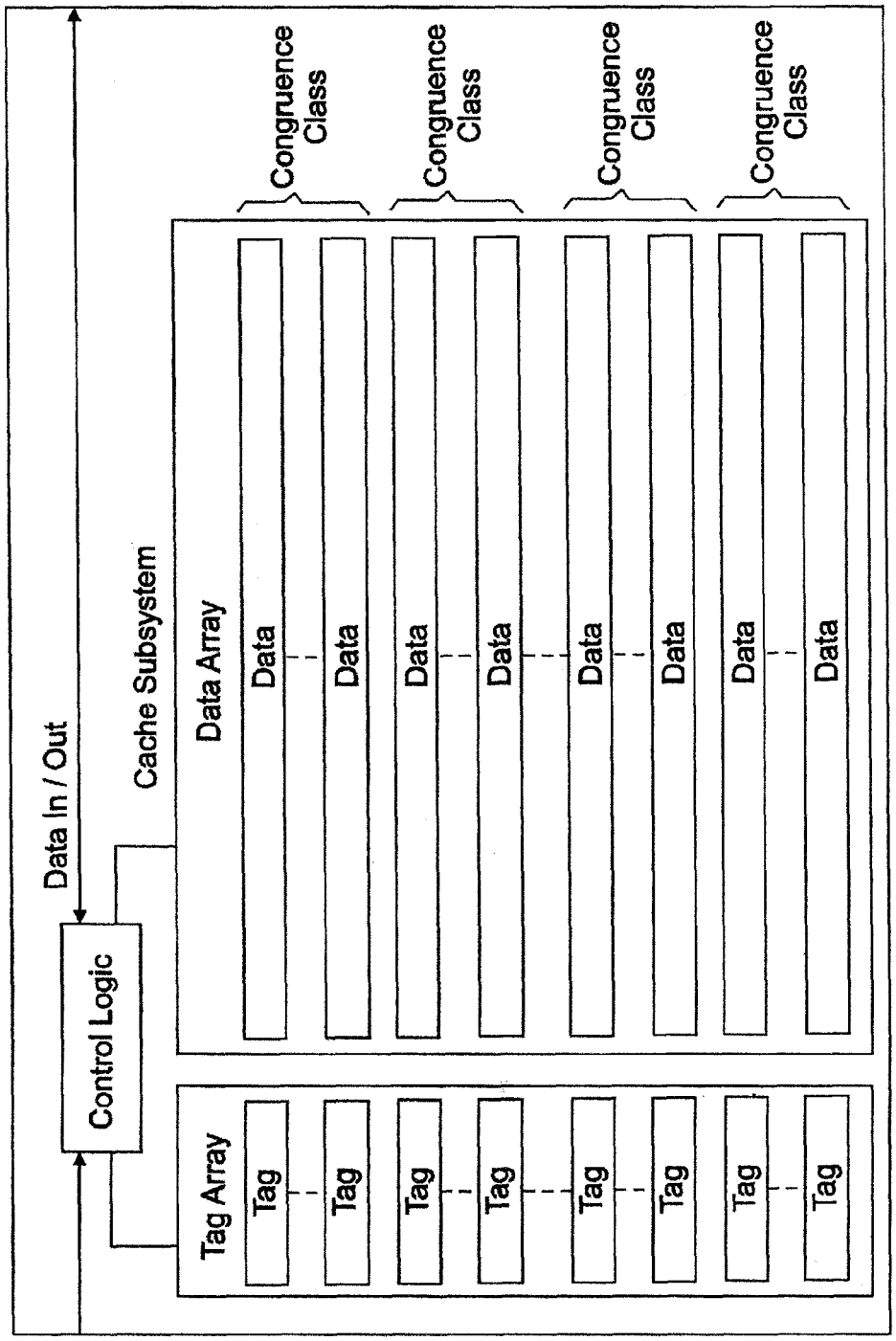
FIG. 2 is a schematic representation of the organization of a L1 cache instruction(s) cache.

The processes and methods here particularly described proceed in the context of an L1 Instruction(s) cache coupled to a computer system processor as shown in FIG. 1 and which has $2^L$ bytes per line, M ways per congruence class, and $2^N$ congruence classes, and in which the instruction(s) address presented to the cache subsystem (FIG. 2) (branch target or flow-through from previous cache line) will be partitioned into the following fields:

Least significant L bits (address byte within line)
Next N bits (index into a specific congruence class)
Most significant bits A typical implementation might have L=6 (16 instruction(s) or 64 bytes per line), M=4 ways per congruence class, and N=7 (128 congruence classes), for a total cache size of 32 KBytes. A typical implementation might also partition each cache line into multiple segments. For instance, a 64 byte line might be made up of data from 4 different arrays (16 bytes or 4 instruction(s)s per array). The motivation for this partitioning is that in some cases the required data can be accessed without powering up the entire cache line, thus saving power.

Figure 3:
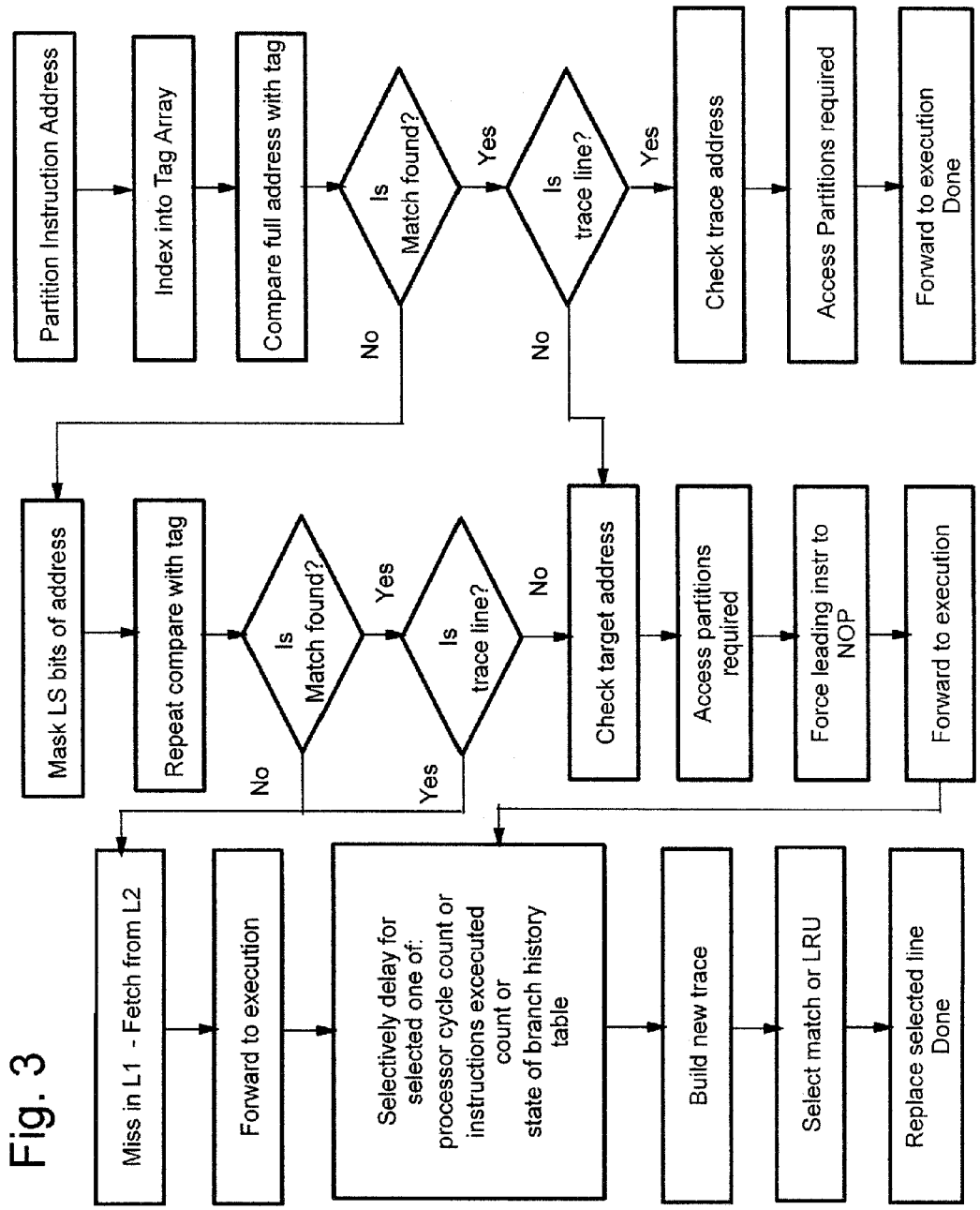
FIG. 3 is a flow chart depicting the processes involved in the operation of a level 1 instruction(s) cache in accordance with this invention.
Figure 4:
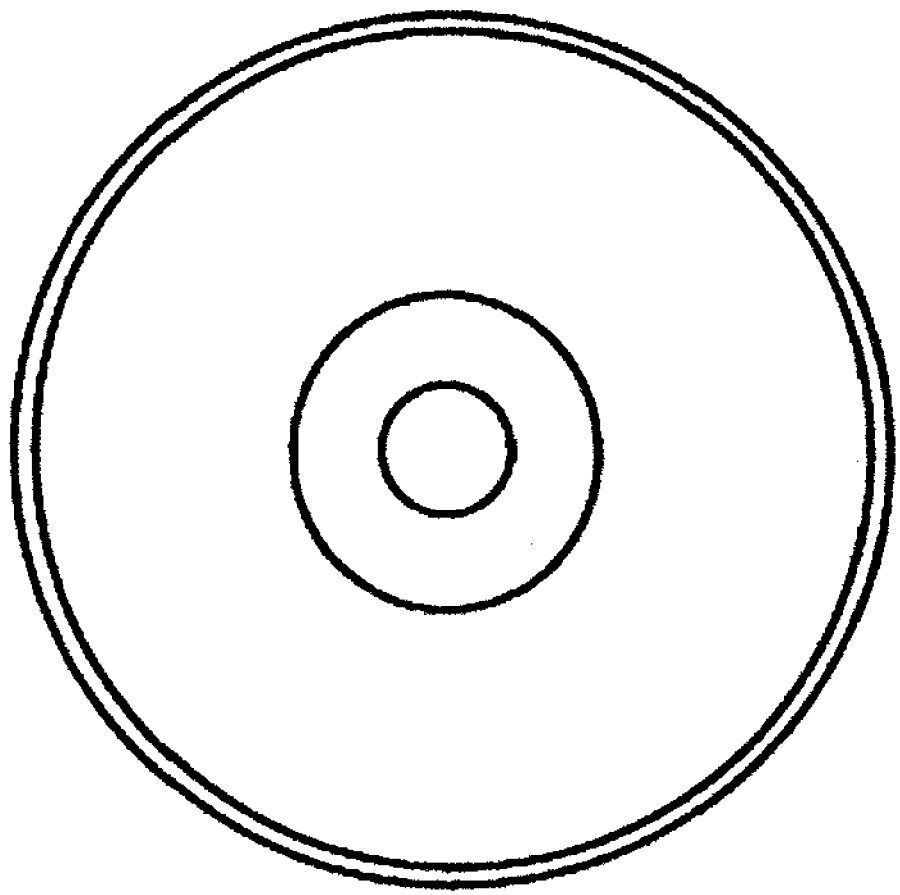
FIG. 4 is a representation of a computer readable medium (here an optical disc such as those known as CDs) bearing computer instructions in accordance with this invention.

The process for accessing the cache then includes the following steps as illustrated in the flow chart of FIG. 3:

Take the N bits in the middle partition of the target instruction(s) address for use as an index into the tag array.

For each of the M entries in the tag array from the congruence class selected in step 1, compare the tag field with the full target instruction(s) address.

If match is found, is it a trace line?

If it is a trace line, check the trace length parameter in the tag. Enable only the partitions in the data array required to access the trace contents.

Access cache line from data array and forward trace to execution pipelines and exit process. (Only one cache line is allowed in cache with the same starting address. This may be either a trace line or conventional cache line.

In the case of a conventional cache line, it is found during this step only if the target instruction(s) address points to the first instruction(s) of the cache line.)

If no match is found, mask off (to zeros) the L least significant bits of the target instruction(s) address.

Repeat the compare with the tags within the selected congruence class. If a match is found, validate that it is a conventional cache line (i.e. with execution starting somewhere other than the first instruction(s)). Note that if it is a trace line with a starting address with zeros in least-significant bits, it is not the trace line that matches the branch target, and can't be used.

Access cache line from data array. Use least significant L bits from the target instruction(s) address to select only the target partition of the data array. This skips groups of instruction(s) with addresses lower than the branch instruction(s) in increments equal to the data array partition size (e.g. 4 instruction(s)).

Overlay instruction(s) to the left of the branch target instruction(s) (within the same partition as the branch target) with an indication of invalid instruction(s) (force to NOP). Then forward instruction(s) to execution pipelines. If no match is found, declare a miss in the L1 cache, and fetch the target address from the L2 cache.

Then build a new trace line, select a match or least recently used (LRU), and replace the selected line.

In order to insure proper operation, certain rules must be enforced when adding a line (either conventional or trace) to the cache:

If the address of the first instruction(s) in the line to be added matches the tag of a line already in the cache, that matching line must be removed in order to add the new line. This insures that a tag will be unique. If there is no match in tags, then the least recently used line (as indicated by LRU or pseudo-LRU) is replaced by the new line.

In accordance with this invention, the building of trace lines is deferred during initial operation of the system. That is, the building of trace lines in the L1 cache is delayed until such time as branch prediction is sufficiently consistent to warrant that step. Thus an additional step is inserted into the process described with reference to FIG. 3. One such approach simply uses a counter to determine that a predetermined number of cycles or processor operation or of executed instruction(s) has been reached. Another approach sets a threshold in a branch history table for predictability of branch instruction(s), and begins trace formation when that threshold is reached. Another approach records the execution of branches and identifies when a sliding window of such executed branches reaches a predetermined threshold of correct predictions. The method described in connection with FIG. 3 is modified by the insertion of a selected one of these delay procedures or such other comparable process as may be defined.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
a computer system central processor; and
layered memory operatively coupled to said central processor and accessible thereby, said layered memory having a level one cache;
said central processor and said layered memory cooperating to:
store standard cache lines in the level one cache;
following an initial delay, selectively store in interchangeable locations of the level one cache of the layered memory both standard cache lines and trace lines;
partition an instruction(s) address presented to the level one cache;
index the instruction(s) address into a tag array of the level one cache;
compare the instruction(s) address with the tag array a first time to determine whether a match is found;
if a match is found on the first comparison, then
determine whether the match is a trace line;
if the match is a trace line, check the trace length parameter, access the required partitions, and forward the instruction(s) for execution by the central processor;
if the match is a conventional cache line, then
check the target address, access the required partitions, force the leading instruction(s) to NOP, and forward the instruction(s) to execution by the central processor, then;
build a new trace line, select a cache line to be replaced and replace the selected cache line with the new trace line;
if no match is found on the first comparison, then
mask the least significant bits of the instruction(s) address; and
compare the masked instruction(s) address with the tag array a second time to determine whether a match is found;
if a match is found on the second comparison; then
if the match is trace line, declare a miss in the level one cache and fetch instruction(s) from a further level cache, forward the instruction(s) for execution by the central processor, build a new trace line, select a cache line to be replaced and replace the selected cache line;
if the match is not a trace line, check the trace address, access the required partitions, force the leading instruction(s) to NOP, and forward the instruction(s) for execution by the central processor; then build a new trace line, select a cache line to be replaced and replace the selected cache line with the new trace line.

2. Apparatus according to claim 1 wherein the delay in storing trace lines is determined by the accumulation of a predetermined count of processor cycles.

3. Apparatus according to claim 1 wherein the delay in storing trace lines is determined by the accumulation of a predetermined count of instruction(s) executed by said processor.

4. Apparatus according to claim 1 wherein the delay in storing trace lines is determined by the state of a branch history table showing that a predetermined threshold of predictability has been attained.

5. Apparatus according to claim 1 wherein the delay in storing trace lines is determined by recording the execution of branches and identifying when a sliding window of such executed branches reaches a predetermined threshold of correct predictions.

6. Apparatus according to claim 1 wherein the delay in storing trace lines is determined by recording a cumulative score for the execution of branches, with the score increasing for each correct prediction and decreasing for each incorrect prediction, and identifying when that score reaches a predetermined threshold of correct predictions.

7. Method comprising:
coupling together a computer system central processor and layered memory accessible by the central processor, the layered memory including a level one cache;
storing standard cache lines in the level one cache;
following an initial delay, selectively storing in interchangeable locations of the level one cache of the layered memory both standard cache lines and trace lines;
partitioning an instruction(s) address presented to the level one cache;
indexing the instruction(s) address into a tag array of the level one cache;
comparing the instruction(s) address with the tag array a first time to determine whether a match is found;
if a match is found on the first comparison, then determining whether the match is a trace line;
if the match is a trace line, checking the trace length parameter, accessing the required partitions, and forwarding the instruction(s) for execution by the central processor;
if the match is a conventional cache line, then checking the target address, accessing the required partitions, forcing the leading instruction(s) to NOP, and forwarding the instruction(s) to execution by the central processor, then building a new trace line, selecting a cache line to be replaced and replacing the selected cache line with the new trace line;
if no match is found on the first comparison, then masking the least significant bits of the instruction(s) address; and
comparing the masked instruction(s) address with the tag array a second time to determine whether a match is found;
if a match is found on the second comparison; then if the match is trace line, declaring a miss in the level one cache and fetching instruction(s) from a further level cache, forwarding the instruction(s) for execution by the central processor, building a new trace line, selecting a cache line to be replaced and replacing the selected cache line;
if the match is not a trace line, checking the trace address, accessing the required partitions, forcing the leading instruction(s) to NOP, and forwarding the instruction(s) for execution by the central processor; then building a new trace line, selecting a cache line to be replaced and replacing the selected cache line with the new trace line.

8. Method according to claim 7 wherein the delay in storing trace lines is determined by the accumulation of a predetermined count of processor cycles.

9. Method according to claim 7 wherein the delay in storing trace lines is determined by the accumulation of a predetermined count of instruction(s) executed by the processor.

10. Method according to claim 7 wherein the delay in storing trace lines is determined by the state of a branch history table showing that a predetermined threshold of predictability has been attained.

11. Method according to claim 7 wherein the delay in storing trace lines is determined by recording a cumulative score for the execution of branches, with the score increasing for each correct prediction and decreasing for each incorrect prediction, and identifying when that score reaches a predetermined threshold of correct predictions.

12. Method according to claim 7 wherein the delay in storing trace lines is determined by recording the execution of branches and identifying when a sliding window of such executed branches reaches a predetermined threshold of correct predictions.

* * * * *